US012784003B2

(12) United States Patent
Schmidt et al.

(10) Patent No.: US 12,784,003 B2
(45) Date of Patent: Nov. 3, 2026

(54) SYSTEMS AND METHODS FOR A MOCK INTERVIEW APPLICATION

(71) Applicant: STATE FARM MUTUAL AUTOMOBILE INSURANCE COMPANY, Bloomington, IL (US)

(72) Inventors: David Schmidt, Dallas, TX (US); Ryan Fowkes, Bloomington, IL (US); Matthew Grizzle, Normal, IL (US); Aarthi Maurya, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 157 days.

(21) Appl. No.: 18/434,189

(22) Filed: Feb. 6, 2024

(65) Prior Publication Data

US 2025/0252404 A1 Aug. 7, 2025

(51) Int. Cl.
*G06Q 10/1053* (2023.01)
*G06F 16/903* (2019.01)
*G06F 16/9035* (2019.01)

(52) U.S. Cl.
CPC ... *G06Q 10/1053* (2013.01); *G06F 16/90335* (2019.01); *G06F 16/9035* (2019.01)

(58) Field of Classification Search
CPC .................................................. G06Q 10/1053
See application file for complete search history.

(56) References Cited

U.S. PATENT DOCUMENTS 11,093,901 B1 8/2021 Preuss et al.
11,450,095 B2 9/2022 Anderton-Yang
2013/0052631 A1* 2/2013 Moni .................... G09B 5/065
434/362

(Continued)

FOREIGN PATENT DOCUMENTS

KR 102236720 B1 4/2021

OTHER PUBLICATIONS

Patil, Rohan, et al. "Real Time Mock Interview using Deep Learning." International Research Journal of Engineering and Technology (IRJET) 10 (2021). (Year: 2021).*

(Continued)

*Primary Examiner* — Brendan S O'Shea
(74) *Attorney, Agent, or Firm* — Bookoff McAndrews, PLLC

(57) ABSTRACT

Various embodiments of this disclosure relate generally to analyzing mock interview video data and providing interview feedback to an interviewee. The method comprises launching a mock interview application from a job post on a job website, analyzing job post data corresponding to a job posting on a job website, the job post data including a plurality of competencies and a plurality of employer specified requirements, determining one or more interview questions corresponding to the plurality of competencies and the plurality of employer specified requirements, displaying the one or more interview questions, receiving, via the user interface, interview video data for each of the one or more interview questions from the interviewee, processing the interview video data to determine interview feedback data and future interview recommendation data, and displaying the interview feedback data and the future interview recommendation data.

20 Claims, 5 Drawing Sheets

(56) References Cited

U.S. PATENT DOCUMENTS

| | | | | |
|---|---|---|---|---|
| 2021/0312399 | A1* | 10/2021 | Asokan | G10L 15/22 |
| 2023/0086724 | A1* | 3/2023 | Wu | G06Q 10/1053 |
| 2023/0088444 | A1* | 3/2023 | Wong | G06Q 10/1053<br>706/46 |
| 2023/0368146 | A1* | 11/2023 | Pande | G06Q 10/1053 |
| 2025/0182636 | A1* | 6/2025 | Subbu | G09B 5/02 |

OTHER PUBLICATIONS

Chou, Yi-Chi, et al. "An AI mock-interview platform for interview performance analysis." 2022 10th international conference on information and education technology (ICIET). IEEE, 2022. (Year: 2022).*

* cited by examiner

SYSTEMS AND METHODS FOR A MOCK INTERVIEW APPLICATION

TECHNICAL FIELD

Various embodiments of this disclosure relate generally to systems and methods for utilizing a mock interview application for providing feedback and recommendations regarding an interviewee's interview responses.

BACKGROUND

The job interview process may be intense, unpredictable, and challenging for many people. Qualified job candidates may have the skills and knowledge needed to perform the job described in an online job post. However, such job candidates may not have had the proper preparation to perform well during the interview process. Additionally, job candidates may have particular accessibility requirements, where without the accessibility requirements being met, the job candidates may not be able to adequately prepare for an interview. Such issues may result in hiring managers passing on candidates with good talent due to the job candidate's poor interview skills. For example, conventional methods may include the job candidate trying to participate in a mock interview process with leadership of the employer, such as a mentor or sponsor. However, the job candidate may have difficulty scheduling a mock interview with the employer's leadership because of scheduling conflicts. Other conventional methods may include the job candidate preparing for the job interview by themselves, without using any tools. However, such methods lack the benefit of the job candidate receiving objective feedback from a third party or recommendations of how to improve the responses to the interview questions. Additionally, for example, the job candidate may not be able to use other interview preparation tools because such tools may not meet the job candidate's accessibility requirements. As a result, improvements for the interview preparation process are desired, so as to improve the job candidate's interview skills and reduce the job candidate's interview anxiety.

This disclosure is directed to addressing above-referenced challenges and/or other problems in the art. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, embodiments are disclosed for utilizing a mock interview application for providing feedback and recommendations regarding an interviewee's interview responses.

In one aspect, an exemplary embodiment of a method for analyzing mock interview video data and providing interview feedback to an interviewee is disclosed. The method may include launching, by one or more processors, a mock interview application from a job post on a job website. The method may include analyzing, by the one or more processors, job post data corresponding to a job post, the job post data including a plurality of competencies and a plurality of employer specified requirements. The method may include determining, by the one or more processors, one or more interview questions corresponding to the plurality of competencies and the plurality of employer specified requirements. The method may include displaying, by the one or more processors, the one or more interview questions on a user interface of an interviewee device. The method may include receiving, by the one or more processors, via the user interface, interview video data for each of the one or more interview questions from the interviewee, wherein the interview video data includes visual data and audio data. The method may include processing, by the one or more processors, the interview video data to determine interview feedback data and future interview recommendation data, wherein the future interview recommendation data includes at least one recommendation for improving the interview feedback data, and wherein the interview feedback data is based on content, clarity, structure, relevance, and depth of the interview video data. The method may include displaying, by the one or more processors, the interview feedback data and the future interview recommendation data on the user interface of the interviewee device.

In one aspect, a computer system for analyzing mock interview video data and providing interview feedback to an interviewee is disclosed. The computer system may comprise a memory having processor-readable instructions stored therein and one or more processors configured to access the memory and execute the processor-readable instructions, which when executed by the one or more processors configures the one or more processors to perform a plurality of functions. The functions may include launching a mock interview application from a job post on a job website. The functions may include analyzing job post data corresponding to the job post, the job post data including a plurality of competencies and a plurality of employer specified requirements. The functions may include determining one or more interview questions corresponding to the plurality of competencies and the plurality of employer specified requirements. The functions may include displaying the one or more interview questions on a user interface of an interviewee device. The functions may include receiving, via the user interface, interview video data for each of the one or more interview questions from an interviewee, wherein the interview video data includes visual data and audio data. The functions may include processing the interview video data to determine interview feedback data and future interview recommendation data, wherein the future interview recommendation data includes at least one recommendation for improving the interview feedback data. The functions may include storing the interview video data and each of the one or more interview questions in at least one database. The functions may include displaying the interview feedback data and the future interview recommendation data on the user interface of the interviewee device.

In one aspect, a non-transitory computer-readable medium containing instructions for analyzing video data and providing feedback is disclosed. The instructions may comprise launching a mock interview application from a job post on a job website. The instructions may comprise analyzing, by one or more processors, job post data corresponding to the job post, the job post data including a plurality of competencies and a plurality of employer specified requirements. The instructions may comprise determining, by the one or more processors, one or more interview questions corresponding to the plurality of competencies and the plurality of employer specified requirements. The instructions may comprise displaying, by the one or more processors, the one or more interview questions on a user interface of an interviewee device. The instructions may comprise receiving, by the one or more processors, via the user interface, interview video data for each of the one or more interview questions from an interviewee, wherein the interview video data includes visual data and audio data. The instructions may comprise processing, by the one or more processors, the interview video data to determine interview feedback data and future interview recommendation data, wherein the future interview recommendation data includes at least one recommendation for improving the interview feedback data. The instructions may comprise displaying, by the one or more processors, the interview feedback data and the future interview recommendation data on the user interface of the interviewee device.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
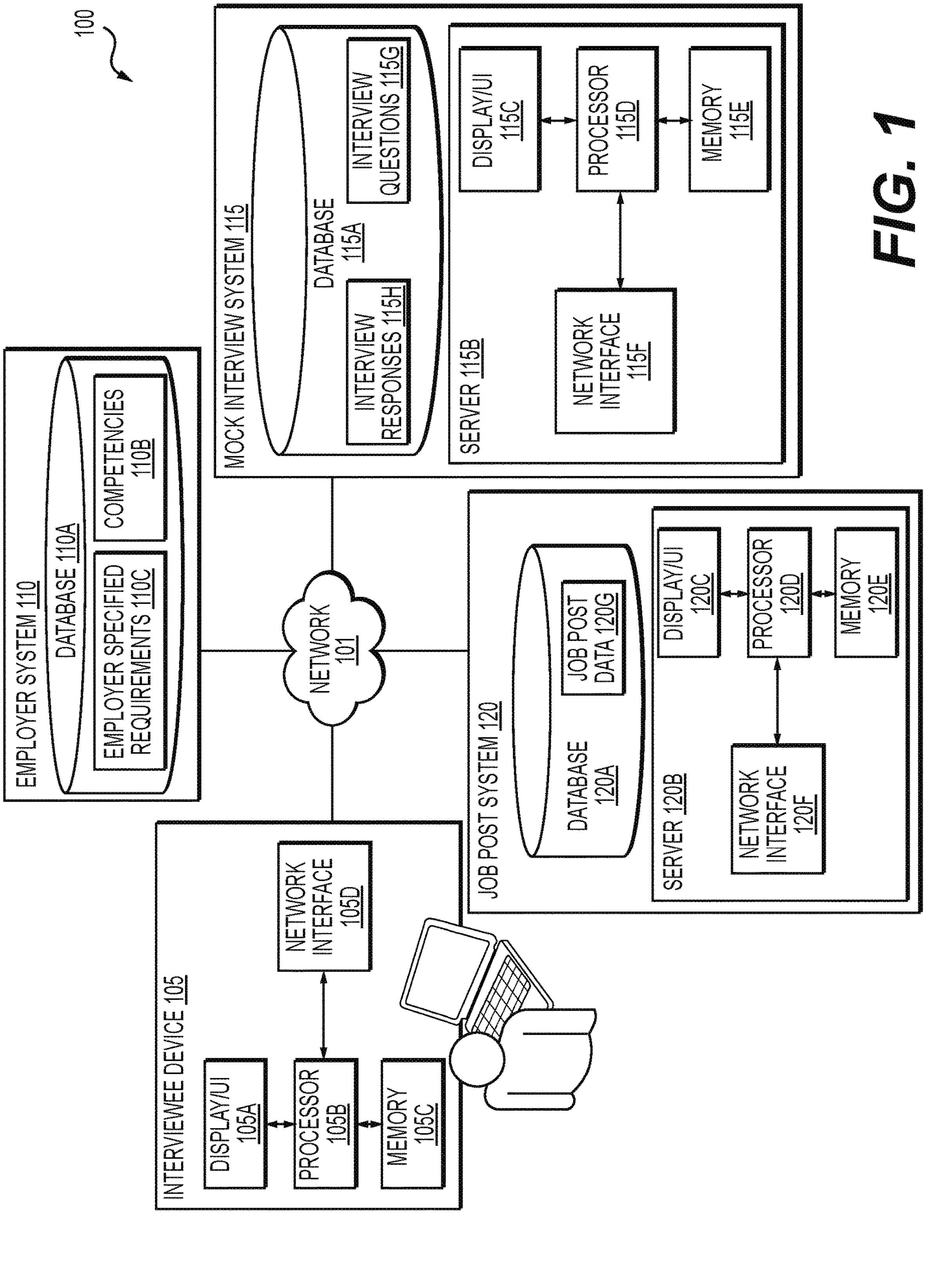
FIG. 1 depicts an exemplary networked computing environment that may be utilized with techniques presented herein, according to one or more embodiments.

According to certain aspects of the disclosure, methods and systems for utilizing a mock interview application for providing feedback and recommendations regarding an interviewee's interview responses are disclosed.

The job interview process may be intense, unpredictable, and challenging for many people. Qualified job candidates may have the skills and knowledge needed to perform the job described in an online job post. However, such job candidates may not have had the proper preparation to perform well during the interview process. Additionally, job candidates may have particular accessibility requirements, where without the accessibility requirements being met, the job candidates may not be able to adequately prepare for an interview. Such issues may result in hiring managers passing on candidates with good talent due to the job candidate's poor interview skills. For example, conventional methods may include the job candidate trying to participate in a mock interview process with leadership of the employer, such as a mentor or sponsor. However, the job candidate may have difficulty scheduling a mock interview with the employer's leadership because of scheduling conflicts. Other conventional methods may include the job candidate preparing for the job interview by themselves, without using any tools. However, such methods lack the benefit of the job candidate receiving objective feedback from a third party or recommendations of how to improve the responses to the interview questions. Additionally, for example, the job candidate may not be able to use other interview preparation tools because such tools may not meet the job candidate's accessibility requirements. As a result, improvements for the interview preparation process are desired, so as to improve the job candidate's interview skills and reduce the job candidate's interview anxiety.

The claimed systems and methods leverage the power of artificial intelligence (AI) to create an efficient, transparent, and personalized mock interview system. For example, by providing feedback scores and future interview recommendations to the job candidate, the disclosed systems and methods enhance a job candidate's interview experience, ensuring that the job candidate is prepared by providing objective feedback, while also efficiently processing interview questions and responses to provide feedback.

The disclosed systems and methods have many advantages, as discussed below. First, the disclosed systems and methods provide personalized interview feedback and recommendations. Existing mock interview tools may not analyze an interviewee's body language when the mock interview tool provides feedback to the interviewee. Additionally, existing mock interview tools may not analyze the interviewee's responses in view of subjective metrics such as content, clarity, structure, relevance, and depth. Existing mock interview tools may also not provide recommendations regarding how the interviewee may adjust their body language and/or responses to improve future interview feedback. The systems and methods described herein personalize the mock interview feedback and recommendations by analyzing the interviewee's body language, as well as providing recommendations regarding how the interviewee may adjust future body language/responses to improve the interview feedback.

Second, the disclosed systems and methods improve efficiency by leveraging AI for providing personalized interview feedback and recommendations. For example, utilizing machine-learning models, such as large language models (LLMs), increases efficiency by providing feedback to the interviewee quickly. Additionally, utilizing the machine-learning models also results in providing the interviewee with objective interview feedback, instead of depending on the subjective feedback of someone who may not have all of the context regarding the interview.

Third, another advantage of the disclosed systems and methods may include providing interviewees with interview feedback transparency by explaining why an interviewee received particular interview feedback. Existing mock interview tools may not provide clear explanations regarding why an interviewee received particular feedback. The systems and methods described in this disclosure offer transparency by allowing interviewees to understand the reasons behind the interview feedback, resulting in enhancing the interviewee's confidence.

Fourth, another advantage of the disclosed systems and methods may include customizing the mock interview tool by launching the mock interview application from a job post. Existing mock interview tools may be generic, where such tools are not customized regarding a particular job post. The systems and methods described in this disclosure allow for the mock interview application to be tailored for the job position being filled, where the mock interview application may analyze and utilize data from a job post to tailor the mock interview application. This may also increase efficiency, where the employer may not need to load data (e.g., competencies) into both the job post and the mock interview application. Additionally, launching the mock interview application from the job post may provide quick and easy access to such mock interview application by the interviewee.

As will be discussed in more detail below, in various embodiments, systems and methods are described for analyzing mock interview video data and providing interview feedback to an interviewee. The systems and methods may include analyzing, by one or more processors, job post data corresponding to a job post on a job website, the job post data including a plurality of competencies and a plurality of employer specified requirements. The systems and methods may include receiving, by the one or more processors, user profile data from a database, wherein the user profile data includes user personal data, user resume data, and user accessibility data, and wherein the user accessibility data includes an accessibility requirement that includes at least one of: a visibility requirement, a language requirement, or an audio requirement. The systems and methods may include determining, by the one or more processors, one or more interview questions corresponding to the plurality of competencies and the plurality of employer specified requirements. The systems and methods may include displaying, by the one or more processors, the one or more interview questions in accordance with the user accessibility data on a user interface of an interviewee device. The systems and methods may include receiving, by the one or more processors, via the user interface, interview video data for each of the one or more interview questions from the interviewee, wherein the interview video data includes visual data and audio data. The systems and methods may include processing, by the one or more processors, the interview video data to determine interview feedback data and future interview recommendation data, wherein the future interview recommendation data includes at least one recommendation for improving the interview feedback data, and wherein the interview feedback data is based on content, clarity, structure, relevance, and depth of the interview video data. The systems and methods may include displaying, by the one or more processors, the interview feedback data and the future interview recommendation data on the user interface of the interviewee device.

Exemplary Environment

FIG. 1 depicts an exemplary environment 100 that may be utilized with the techniques presented herein. At least one interviewee device 105 (e.g., a user device), at least one employer system 110 (e.g., an external system), and at least one mock interview system 115 (e.g., a server system) may communicate across a network 101. As will be discussed in further detail below, the mock interview system 115 may communicate with one or more of the other components of the environment 100 across network 101.

In some embodiments, the components of the environment 100 are associated with a common entity. In some embodiments, one or more of the components of the environment are associated with a different entity than another. For example, the interviewee device 105 may be associated with one or more users, e.g., one or more interviewees who wish to participate in a mock interview. The employer system 110 may be associated with one or more employers who have posted a job post in the job post system 120. The mock interview system 115 may be associated with a mock interview platform for generating and analyzing mock interview data. The job post system 120 may act as a central repository for job posts received from the employer system 110. In some embodiments, the job post system 120 may be internal or external to the employer system 110. The systems and devices of the environment 100 may communicate in any arrangement. As will be discussed herein, systems and/or devices of the environment 100 may communicate in order to one or more of generate, train, and/or use a machine-learning model to provide interview feedback and/or recommendations to an interviewee, among other activities.

The interviewee device 105 may be configured to enable the user (e.g., an interviewee) to access and/or interact with other systems in the environment 100. For example, the interviewee device 105 may interact with the mock interview system 115 to submit responses to mock interview questions, as well as receive feedback from the mock interview system 115. The interviewee device 105 may be a computer system such as, for example, a desktop computer, a mobile device, a tablet, a virtual reality device, and the like. In some embodiments, the interviewee device 105 may include one or more electronic application(s), e.g., a program, plugin, browser extension, etc., installed on a memory of the interviewee device 105.

The interviewee device 105 may include a display/user interface (UI) 105A, a processor 105B, a memory 105C, and/or a network interface 105D. The interviewee device 105 may execute, by the processor 105B, an operating system (O/S) and at least one electronic application (each stored in memory 105C). The electronic application may be a desktop program, a browser program, a web client, or a mobile application program (which may also be a browser program in a mobile O/S), an applicant specific program, system control software, system monitoring software, software development tools, or the like. For example, environment 100 may extend information on a web client that may be accessed through a web browser. In some embodiments, the electronic application(s) may be associated with one or more of the other components in the environment 100. For example, the electronic application may include a mock interview application that communicates with the mock interview system 115. The application may manage the memory 105C, such as a database, to transmit streaming data to network 101. The display/UI 105A may be a touch screen or a display with other input systems (e.g., mouse, keyboard, etc.) so that the user(s) may interact with the application and/or the O/S. The network interface 105D may be a TCP/IP network interface for Ethernet or wireless communications with the network 101. The processor 105B, while executing the application, may generate data and/or receive user inputs from the display/UI 105A and/or receive/transmit messages to the mock interview system 115, and may further perform one or more operations prior to providing an output to the network 101.

The employer system 110 (e.g., an external system) may be, for example, one or more third party and/or auxiliary systems that integrate and/or communicate with the mock interview system 115 and/or job post system 120 in performing various mock interview and/or job post tasks. The employer system 110 may be in communication with other device(s) or system(s) in the environment 100 over the one or more networks 101. For example, the employer system 110 may communicate with the job post system 120 via API (application programming interface) access over the network 101, and also communicate with the mock interview system 115, via web browser access over the network 101.

The employer system 110 may store or have access to a database 110A. The database 110A may include may include one or more competencies 110B and/or one or more employer specified requirements 110C. The one or more competencies 110B may correspond to the employer's general pre-set candidate requirements for a job position corresponding to the job post, where the employer may have selected particular competencies 110B for a specific job post. The one or more competencies 110B may have general applicability to multiple job posts. For example, the one or more competencies 110B may include pre-set requirements from a Human Resources department. Exemplary competencies may include technology competencies (e.g., familiarity with particular software programs) and/or personality competencies (e.g., able to work in a team environment). Additionally, or alternatively, a machine-learning model may analyze a job description and determine the competencies 110B. For example, the one or more machine-learning models may analyze other job posts and/or the employer's internal rules to generate the one or more competencies 110B.

The one or more employer specified requirements 110C may include one or more requirements that are specifically related to the job position corresponding to the job post. The employer specified requirements 110C may be preexisting requirements or they may be created for the specific job position. For example, a hiring manager may set the one or more employer specified requirements 110C. The one or more employer specified requirements 110C may include requirements related to specific technical skills and/or personal skills desired for the job post. For example, if the job post is related to a programmer position, an employer specified requirement 110C may include a requirement that the job candidate have at least 5 years of experience programming in a particular programming language. In some embodiments, the one or more employer specified requirements 110C may include input from the leadership of the employer, such as problem solving questions.

In various embodiments, the network 101 may be a wide area network ("WAN"), a local area network ("LAN"), a personal area network ("PAN"), or the like. In some embodiments, network 101 includes the Internet, and information and data provided between various systems occurs online. "Online" may mean connecting to or accessing source data or information from a location remote from other devices or networks coupled to the Internet. Alternatively, "online" may refer to connecting or accessing a network (wired or wireless) via a mobile communications network or device. The Internet is a worldwide system of computer networks-a network of networks in which a party at one computer or other device connected to the network can obtain information from any other computer and communicate with parties of other computers or devices. The most widely used part of the Internet is the World Wide Web (often-abbreviated "WWW" or called "the Web"). A "website page" generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like.

The mock interview system 115 may include an electronic data system, e.g., a computer-readable memory such as a hard drive, flash drive, disk, and the like. In some embodiments, the mock interview system 115 includes and/or interacts with an application programming interface for exchanging data to other systems, e.g., one or more of the other components of the environment.

The mock interview system 115 may include a database 115A and at least one server 115B. The mock interview system 115 may be a computer, system of computers (e.g., rack server(s)), and/or or a cloud service computer system. The mock interview system 115 may store or have access to database 115A (e.g., hosted on a third party server or in memory 115E). The database 115A may include one or more interview questions 115G and/or interview responses 115H. The interview questions 115G may correspond to the one or more competencies 110B and/or the employer specified requirements 115C. The interview responses 115H may correspond to the mock interview video data for each of the interview questions 115G. The server(s) 115B may include a display/UI 115C, a processor 115D, a memory 115E, and/or a network interface 115F. The display/UI 115C may be a touch screen or a display with other input systems (e.g., mouse, keyboard, etc.) for an operator of the server 115B to control the functions of the server 115B. The server system 115 may execute, by the processor 115D, an operating system (O/S) and at least one instance of a servlet program (each stored in memory 115E).

The mock interview system 115 may generate, store, train, or use a machine-learning model configured to analyze responses to interview questions and provide feedback and/or interview improvement recommendations. The mock interview system 115 may include a machine-learning model and/or instructions associated with the machine-learning model, e.g., instructions for generating a machine-learning model, training the machine-learning model, using the machine-learning model, and the like. The mock interview system 115 may include instructions for processing mock interview responses, e.g., based on the output of the machine-learning model, and/or operating the display 115C to output an action, e.g., as adjusted based on the machine-learning model. The server system 115 may include training data, e.g., training interview responses, training feedback, and/or training future interview recommendations.

In some embodiments, a system or device other than the mock interview system 115 is used to generate and/or train the machine-learning model. For example, such a system may include instructions for generating the machine-learning model, the training data and ground truth, and/or instructions for training the machine-learning model. A resulting trained machine-learning model may then be provided to the mock interview system 115.

Generally, a machine-learning model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine-learning model, e.g., compare the output of the trained model with the ground truth for that portion of the training data to evaluate an accuracy of the trained model. The training of the machine-learning model may be configured to cause the machine-learning model to learn associations between a training mock interview dataset and training interview feedback data, such that the trained machine-learning model is configured to analyze interview responses and provide feedback and recommendations based on the learned associations.

In various embodiments, the variables of a machine-learning model may be interrelated in any suitable arrangement in order to generate the output. For example, the machine-learning model may include one or more convolutional neural networks ("CNN") configured to determine interview feedback data and/or future interview recommendations, and may include further architecture, e.g., a connected layer, neural network, etc., configured to determine a relationship between the identified features in order to determine interview feedback data and/or future interview recommendations.

Further aspects of the machine-learning model and/or how it may be utilized to determine interview feedback and/or recommendations is described in further detail in the method below. In the following methods, various acts may be described as performed or executed by a component from FIG. 1, such as the interviewee device 105, the employer system 110, the mock interview system 115, the job post system 120, or components thereof. However, it should be understood that in various embodiments, various components of the environment 100 discussed below may execute instructions or perform acts including the acts discussed below. An act performed by a device may be considered to be performed by a processor, actuator, or the like associated with that device. Further, it should be understood that in various embodiments, various steps may be added, omitted, and/or rearranged in any suitable manner.

The job post system 120 may include a database 120A and at least one server 120B. The job post system 120 may be a computer, system of computers (e.g., rack server(s)), and/or or a cloud service computer system. The job post system 120 may store or have access to database 120A (e.g., hosted on a third party server or in memory 120E). The database 120A may include job post data 120G. The job post data 120G may include data for one or more job posts. For example, the job post data 120G may include a job position title, a job position description, an employer, a salary amount, and/or a start date for each job post. In some embodiments, the job post data 120G may also include the competencies 110B and/or the employer specified requirements 110C, which may have been retrieved from the employer system 110. The server(s) 120B may include a display/UI 120C, a processor 120D, a memory 120E, and/or a network interface 120F. The display/UI 120C may be a touch screen or a display with other input systems (e.g., mouse, keyboard, etc.) for an operator of the server 120B to control the functions of the server 120B. The server system 120 may execute, by the processor 120D, an operating system (O/S) and at least one instance of a servlet program (each stored in memory 120E). In some embodiments, the job post system 120 may be internal to the employer system 110, where the job post system 120 may be included within employer system 110.

In general, any process or operation discussed in this disclosure that is understood to be computer-implementable, such as the process illustrated in FIGS. 2, 3A, 3B, and 4 may be performed by one or more processors of a computer system, such as any of the systems or devices in the environment 100 of FIG. 1, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples below, may include one or more computing devices, such as one or more of the systems or devices in FIG. 1. One or more processors of a computer system may be included in a single computing device or distributed among a plurality of computing devices. A memory of the computer system may include the respective memory of each computing device of the plurality of computing devices.

Although depicted as separate components in FIG. 1, it should be understood that a component or portion of a component in the environment 100 may, in some embodiments, be integrated with or incorporated into one or more other components. For example, a portion of the display 115C may be integrated into the user device 105 or the like. In some embodiments, operations or aspects of one or more of the components discussed above may be distributed amongst one or more other components. Any suitable arrangement and/or integration of the various systems and devices of the environment 100 may be used.

Exemplary Flow Chart for Utilizing a Mock Interview Application

Figure 2:
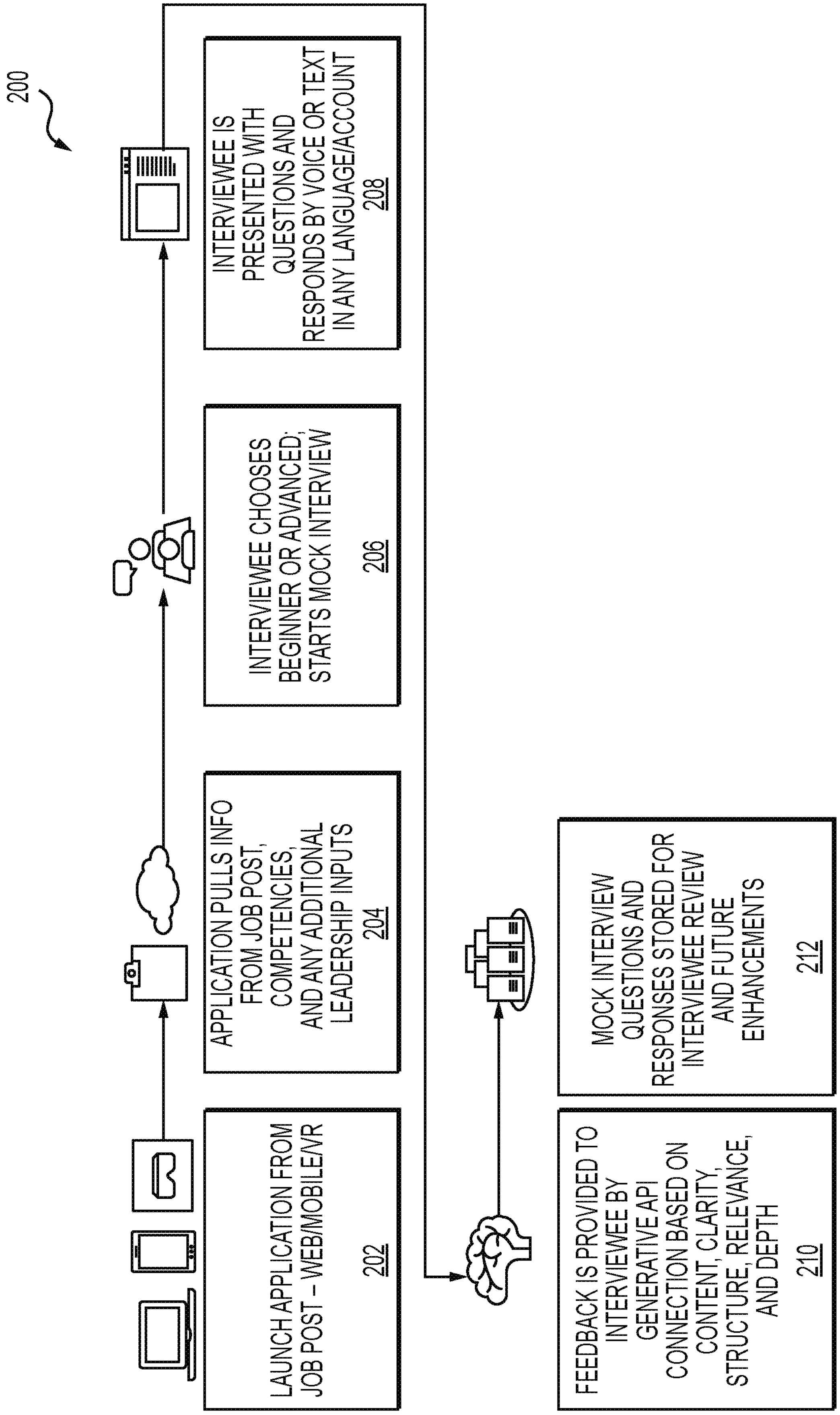
FIG. 2 depicts a flow chart for a mock interview application, according to one or more embodiments.

FIG. 2 depicts a flow chart for a mock interview application, according to one or more embodiments.

The mock interview application may be launched from a job post, where the job post may be displayed via the web, a mobile device, or a virtual reality device (Step 202). For example, the job post system 120 may display one or more job posts, from the job post data 120G, via interviewee device 105. An interviewee may then select a job post from the one or more jobs posts displayed on the interviewee device 105 (e.g., via display 105A). In response to the selection of the job post, the mock interview application 115 may be launched from the selected job post. For example, the job post system 120 may launch the mock interview system 115 in response to a selection of a job post from the job post data 120G.

The mock interview application may pull information from the job post, competencies, and any additional leadership inputs (Step 204). The mock interview application 115 may communicate with the job post system 120, via one or more APIs, to retrieve the job post data 120G. In some embodiments, the mock interview application 115 may communicate with both the job post system 120 to retrieve the job post data 120G, as well as the employer system 110 to retrieve the one or more competencies 110B and/or the employer specified requirements 110C. The mock interview application 115 may then parse and analyze the job post data 120G, the one or more competencies 110B, and/or the employer specified requirements 110C to determine the interview questions for the mock interview.

The job post system 120 may communicate with the employer system 110, via the network 101, to retrieve the one or more competencies 110B and/or the employer specified requirements 110C. For example, job post system 120 may send one or more requests to the employer system 110, via one or more APIs, for the one or more competencies 110B and/or the employer specified requirements 110C. In response to receiving the one or more requests, the employer system 110 may send the one or more competencies 110B and/or the employer specified requirements 110C to the job post system 120. Upon receiving the one or more competencies 110B and/or the employer specified requirements 110C, the job post system 120 may store the one or more competencies 110B and/or the employer specified requirements 110C as job post data 120G in the database 120A. In some embodiments, the mock interview system 115 may send additional periodic requests to the employer system 110, via the network 101, for updated competencies 110B and/or updated employer specified requirements 110C. Upon receiving the updated one or more competencies 110B and/or the updated employer specified requirements 110C, the job post system 120 may store the updated one or more competencies 110B and/or the updated employer specified requirements 110C as job post data 120G in the database 120A. In some embodiments, the job post system 120 may automatically send the one or more competencies 110B and/or the updated employer specified requirements 110C to the job post system 120. Additionally, or alternatively, in some embodiments, such as when the job post system 120 is internal to the employer system 110, the job post system 120 may access one or more databases that may store the one or more competencies 110B and/or the employer specified requirements 110C.

The interviewee may choose a beginner level or an advanced level of difficulty for the interview questions (Step 206). The beginner level may correspond to a lower difficulty level of interview questions. For example, the beginner level may focus on teaching interview behaviors. The advanced level may correspond to a higher difficulty level of interview questions. For example, the advanced level may mimic an interview setting. The mock interview system 115 may display a graphical widget corresponding to the beginner difficulty level and a graphical widget corresponding to the advanced difficulty level on the display 105A of the interviewee device 105. In response to the displaying, the interviewee may select one of the graphical widgets. The mock interview system 115 may receive the selection and retrieve one or more interview questions, which should be part of the mock interview, that correspond to the selected difficulty level.

The mock interview application may present the interviewee with interview questions that correspond to the beginner level or the advanced level of difficulty, where the interviewee may respond to the interview questions by voice or text in any language/account (Step 208). The mock interview system 115 may analyze the interview questions to determine a subset of interview questions that are the selected difficulty level. The mock interview system 115 may display the interview questions on the display 105A of the interviewee device 105. The interview questions may be displayed in any language and via any account. For example, the interview questions may be displayed via the interviewee's job post account. The interview questions may be displayed as text, still image, video, audio, or a combination of such. The interview questions may be displayed all at once, individually, or in groups.

The interviewee may respond to the interview questions by inputting text, still images, video, audio, or a combination of such. The interviewee may respond to each of the interview questions all at once, individually, or in groups. Additionally, the interviewee may respond to the interview questions in any language or via any account. For example, the interviewee may respond to the interview question by uploading a video created using a social media account.

The mock interview application may provide feedback to the interviewee by a generative API connection based on content, clarity, structure, relevance, and depth (Step 210). The feedback may be provided to the interviewee after each interview question and response. Alternatively, the feedback may be provided to the interviewee after all of the interview questions have responses. A generative artificial intelligence model may receive mock interview data, such as the job post data 120G, the interview questions 115G, the interviewee's responses, the one or more competencies 110B, and/or the employer specified requirements 110C. The generative artificial intelligence model may then analyze the mock interview data to generate feedback. For example, the generative artificial intelligence model may analyze the mock interview data based on content, clarity, structure, relevance and depth. The feedback may include a feedback score for each interview question response and/or an overall feedback score for all of the responses to the interview questions. Additionally, or alternatively, the feedback may include text, still images, audio, or video that include an analysis of the interviewee's responses. The mock interview system 115 may then display all or some of the feedback. For example, the mock interview system 115 may display some or all of the feedback on the display 105A of the interviewee device 105.

The mock interview application may store the mock interview questions and responses for the interviewee to review, as well as for future enhancements (Step 212). The mock interview system 115 may store the interview questions 115G and interview responses 115H in the database 115A. The mock interview system 115 may also store the feedback in the database 115A. For example, the interviewee device 105 may send one or more requests to the mock interview system 115 for accessing previous interview questions and responses. Upon receiving the one or more requests, the mock interview system 115 may access the database 115A to retrieve the interview questions 115G and responses 115H. The mock interview system 115 may then send the interview questions 115G and responses 115H to the interviewee device 105. The interviewee device 105 may display the interview questions 115G and responses 115H via the display 105A and/or store the interview questions 115G and responses 115H in the database 115A. The interviewee may then review the interview questions 115G and responses 115H to determine whether to change how the interviewee responds to future interview questions.

Although FIG. 2 shows example blocks of exemplary flow chart 200, in some implementations, the exemplary flow chart 200 may include additional blocks, fewer blocks, different blocks, or differently arranged blocks than those depicted in FIG. 2. Additionally, or alternatively, two or more of the blocks of the exemplary flow chart 200 may be performed in parallel.

Exemplary Method for Utilizing a Mock Interview Application

Figure 3A:
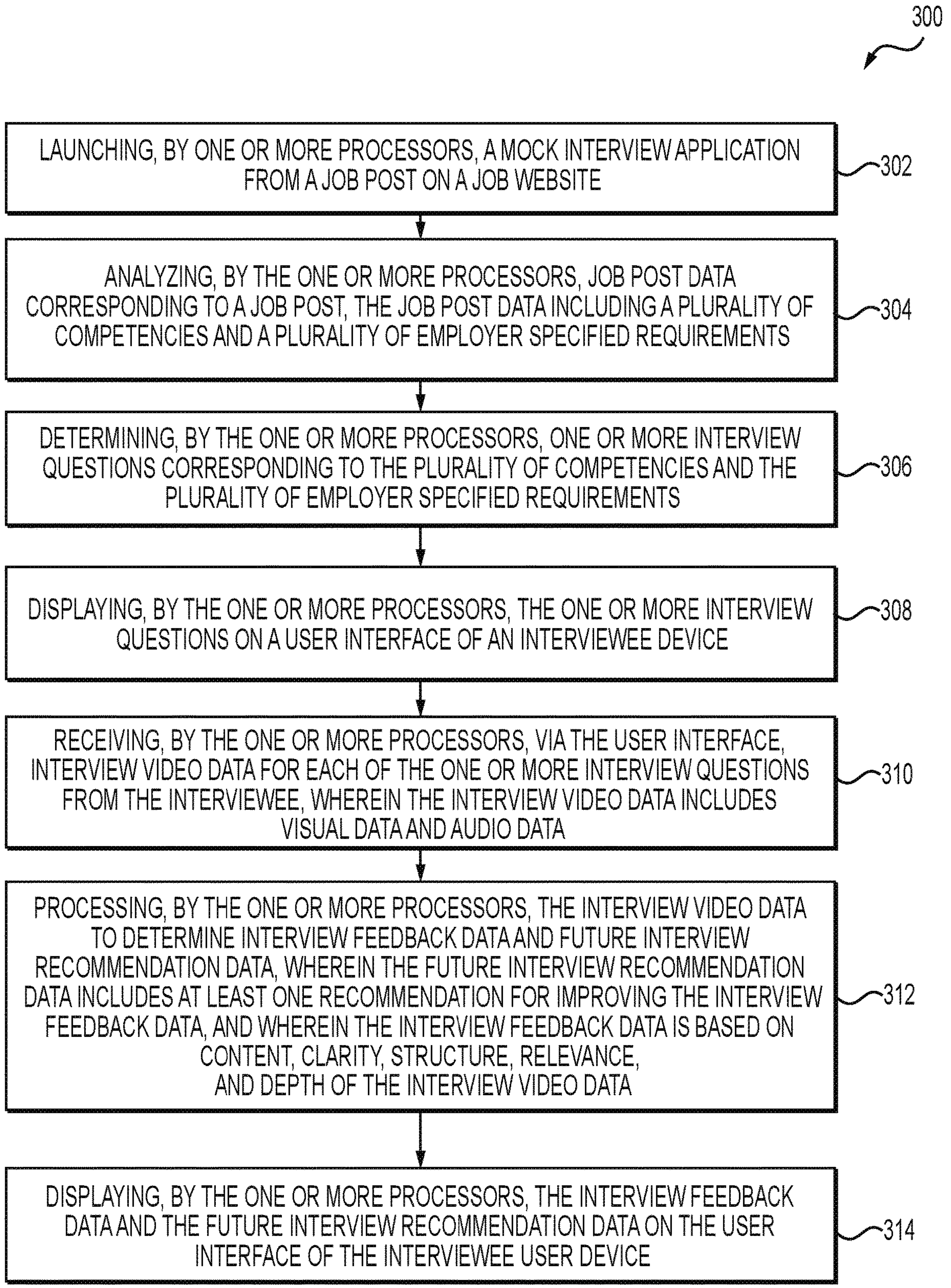
FIG. 3A depicts a flowchart of an exemplary method 300 for analyzing mock interview video data and providing interview feedback to an interviewee, according to one or more embodiments.
Figure 3B:
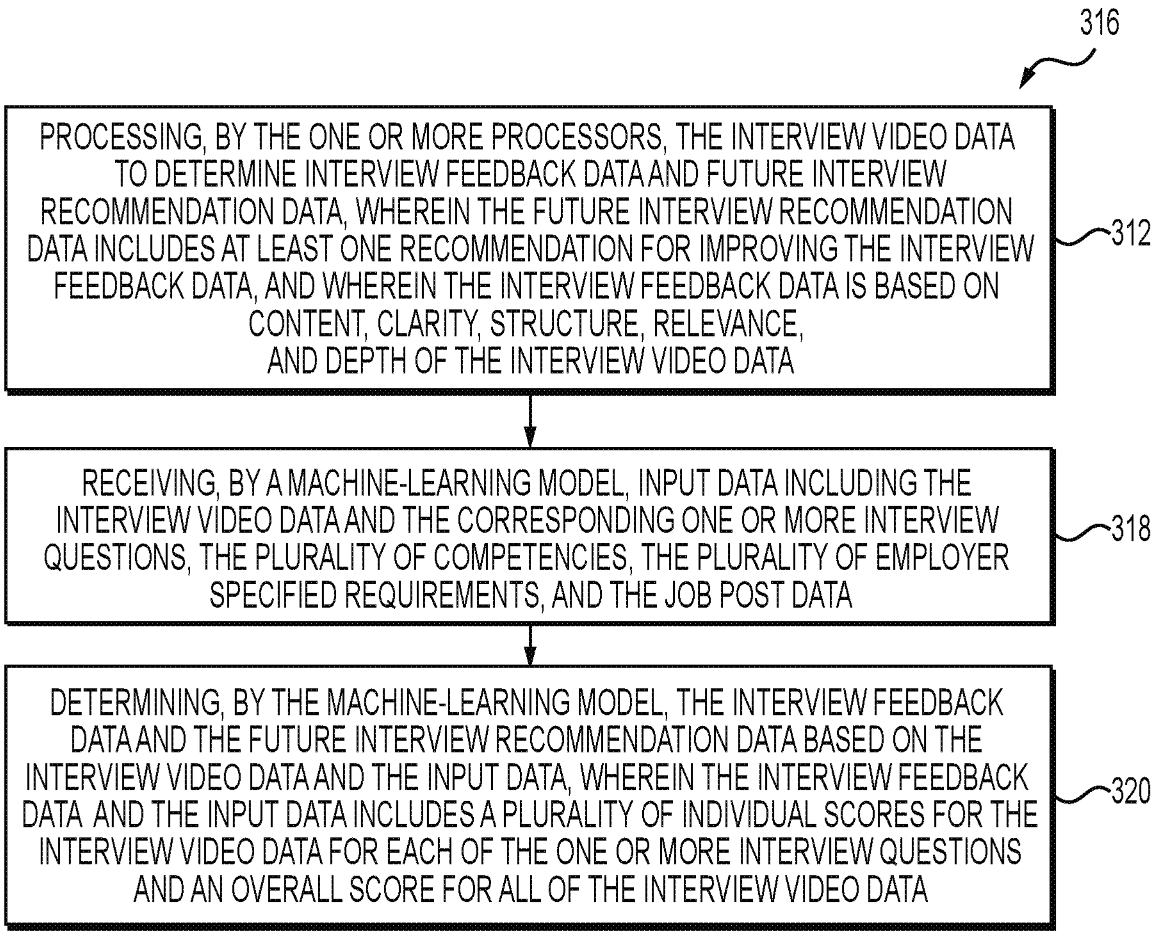
FIG. 3B depicts a flowchart of an exemplary method 316 for utilizing a machine-learning model to determine interview feedback data and a future interview recommendation, according to one or more embodiments.

FIG. 3A depicts a flowchart of an exemplary method 300 for analyzing mock interview video data and providing interview feedback to an interviewee, where FIG. 3B depicts a flowchart of an exemplary method 316, which expands on Step 312 of FIG. 3A, for utilizing a machine-learning model to determine interview feedback data and a future interview recommendation, according to one or more embodiments. Methods 300 and 316 may be performed by one or more processors (e.g., processor 115D) of a server (e.g., server 115B) that is in communication with one or more user devices (e.g., interviewee device 105) and other external system(s) (e.g., employer system 110, mock interview system 115, job post system 120) via a network (e.g., network 101). However, it should be noted that methods 300 and 316 may be performed by any one or more of the interviewee device 105, employer system 110, mock interview system 115, or the job post system 120.

The method may include launching, by one or more processors, a mock interview application from a job post on a job website (Step 302). As discussed above, the job post system (e.g., job post system 120) may display one or more job posts from the job post data (e.g., job post data 120G) the interviewee device (e.g., the web, a mobile device, or a virtual reality) (e.g., interviewee device 105). An interviewee may then select a job post from the one or more jobs posts displayed on the interviewee device. In response to the selection of the job post, the mock interview system may launch a mock interview application from the selected job post. For example, the job post system may launch the mock interview system in response to a selection of a job post from the job post data.

The method may include analyzing, by one or more processors, job post data (e.g., job post data 120G) corresponding to a job post on a job website, the job post data including a plurality of competencies (e.g., competencies 110B) and a plurality of employer specified requirements (e.g., employer specified requirements 110C) (Step 304). A job website, which may be hosted by a job post system (e.g., job post system 120), may display a plurality of job posts, where each job post may correspond to an open job position at an employer. For example, a mock interview system (e.g., mock interview system 115) may analyze the job post data to determine the competencies and employer specified requirements. As discussed above, the competencies may correspond to an employer's general pre-set requirements for the job position corresponding to the job post. The plurality of employer specified requirements may correspond to one or more requirements that are specifically related to the job position corresponding to the job post. The mock interview system may receive the competencies and/or the employer specified requirements from an employer system (e.g., employer system 110).

In some embodiments, the method may include analyzing, by the one or more processors, via the machine-learning model, the job post data and the plurality of competencies. The machine-learning model may receive the job post data and the competencies as input. The machine-learning model may then analyze the job post data and the competencies. The method may further include, based on the plurality of competencies, determining, by the one or more processors, via the machine-learning model, at least one additional competency. Based on analyzing the job post data and the competencies, the machine-learning model may determine at least one additional competency.

In some embodiments, the machine-learning model may have been previously trained to determine additional competencies. For example, the machine-learning model may have been trained based on training data. The training data may include training job post data, training competencies, and training additional competencies. The training additional competencies may include labels that indicate a relationship between a training additional competency and the training job post data and/or a training competency. The machine-learning model may be trained by analyzing the training data to determine one or more relationships between the training competencies and the training additional competencies.

In some embodiments, the method may further include receiving, by the one or more processors, user profile data from a database, wherein the user profile data includes user personal data, user resume data, and user accessibility data, and wherein the user accessibility data includes an accessibility requirement that includes at least one of: a visibility requirement, a language requirement, or an audio requirement. However, the mock interview system may run without receiving the user profile data. The user profile data may correspond to a user profile of an interviewee associated with the job post system, where the database (e.g., database 120A) of the job post system may store the user profile. For example, an interviewee may input the user profile data via the interviewee device (e.g., interviewee device 105) to the job post system (e.g., job post system 120), where the job post system may store the user profile data in the database (e.g., job post data 120G). The user personal data may include the interviewee's personal data, such as the interviewee's name, address, phone number, email, and the like. The user resume data may include the interviewee's professional data, such as previous jobs, educational credentials, awards, and the like. The user resume data may also include a copy of the interviewee's resume. The user accessibility data may include the interviewee's accessibility requirements, such as a visibility requirement, a language requirement, or an audio requirement. The visibility requirement may correspond to how the interview questions are displayed on the interviewee device. For example, the interviewee may request that the interview questions are displayed in an extra-large front on the interviewee device. The language requirement may correspond to the language of the interview questions, when the interview questions are presented to the interviewee. The audio requirement may correspond to how the audio of the interview questions is played to the interviewee. For example, the interviewee may request that the audio of each interview questions is played to the interviewee at a slow speed. In some embodiments, the user accessibility data may be received directly from the interviewee. Additionally, or alternatively, the user accessibility data may be inferred from the user personal data and/or the user resume data.

The method may further include determining, by the one or more processors, one or more interview questions corresponding to the plurality of competencies and the plurality of employer specified requirements (Step 306). The mock interview system may analyze the competencies and the employer specified requirements to determine the interview questions. For example, the mock interview system may search the database (e.g., database 115A) for interview questions (e.g., interview questions 115G) that correspond to the competencies and the employer specified requirements. In some embodiments, the relationship between the interview questions and the competencies and/or the employer specified requirements may be hard-coded. Additionally, or alternatively, the interview questions, the competencies, and/or the employer specified requirements may be analyzed to determine a relationship. For example, the mock interview system may analyze the competencies and/or the employer specified requirements for one or more keywords, and the mock interview system may then use such keywords to search the database for related interview questions.

In some embodiments, determining the one or more interview questions may include querying, by the one or more processors, the at least one database (e.g., database 115A) for the one or more interview questions (e.g., interview questions 115G) based on the plurality of competencies (e.g., competencies 110B). For example, the mock interview system may generate one or more queries based on the competencies. The queries may include keywords that correspond to the competencies. The mock interview system may send the queries to the database that stores the interview questions. Additionally, determining the one or more interview questions may further include, in response to the querying, receiving, by the one or more processors, the one or more interview questions from the at least one database. The interview questions may correspond to the keywords contained in the queries.

In some embodiments, determining the one or more interview questions may include querying, by the one or more processors, the at least one database (e.g., database 115A) for the one or more interview questions (e.g., interview questions 115G) based on the plurality of employer specified requirements (e.g., employer specified requirements 110C). For example, the mock interview system may generate one or more queries based on the employer specified requirements. The queries may include keywords that correspond to the employer specified requirements. The mock interview system may send the queries to the database that stores the interview questions. Additionally, determining the one or more interview questions may further include, in response to the querying, receiving, by the one or more processors, the one or more interview questions from the at least one database. The interview questions may correspond to the keywords contained in the queries.

In some embodiments, the method may include displaying, by the one or more processors, one or more interview question difficulty levels on the user interface. As described above, the interview question difficulty levels may include a beginner level and an advanced level. The beginner level may correspond to a lower difficulty level of interview questions. Additionally, the beginner level may also provide additional feedback during the mock interview process, resulting in helping the interviewee improve during the process. The advanced level may correspond to a higher difficulty level of interview questions. Additionally, the advanced level may wait to provide feedback until the end of the mock interview process. For example, the mock interview application may hold all feedback until all of the mock interview questions have been answered, and the mock interview application may then provide both summarized and specific feedback. The mock interview system may display graphical widgets corresponding to the beginner level and the advanced level. The method may further include, in response to the displaying, receiving, by the one or more processors, a user selection of one of the one or more interview question difficulty levels. For example, the interviewee may select one of the graphical widgets that corresponds to a difficulty level. The method may further include updating, by the one or more processors, the one or more interview questions to correspond to the selected one or more interview question difficulty levels. In some embodiments, each of the interview questions may be stored with a corresponding difficulty level in the database. The one or more interview questions that correspond to the competencies and/or the employer specified requirements may be filtered based on the difficulty level of the interview questions. For example, if the interviewee selected the widget corresponding to the beginner level, the interview questions may be filtered, where the only remaining interview questions correspond to the beginner level.

In some embodiments, the method may include analyzing, by the one or more processors, via the machine-learning model, the user resume data. The method may further include generating, by the one or more processors, via the machine-learning model, one or more resume interview questions based on the user resume data, wherein the one or more interview questions include the one or more resume interview questions. For example, the machine-learning model may have been previously trained to analyze the user resume data to select particular keywords and/or phrases, and then to generate the interview questions based on such keywords and/or phrases.

The method may further include displaying, by the one or more processors, the one or more interview questions (Step 308). The interview questions may be displayed individually, all at the same time, or in groups. Additionally, displaying the interview questions may include displaying text, still images, audio, and/or video corresponding to the interview questions (e.g., interview questions 115G) on a user interface (e.g., display 105A) of the interviewee device (e.g., interviewee device 105).

In some embodiments, displaying, by the one or more processors, the one or more interview questions may be done in accordance with the user accessibility data on a user interface of an interviewee device. The interview questions may be displayed in accordance with the user accessibility data. For example, the audio requirement of the user accessibility data may indicate that audio of the interview questions should be played with the corresponding interview question. The displaying may include displaying the text of the interview question and playing audio of the corresponding interview question.

The method may further include receiving, by the one or more processors, via the user interface, interview video data for each of the one or more interview questions from the interviewee, wherein the interview video data includes visual data and audio data (Step 310). The interview video data may include responses to the interview questions, where the responses may include text, still images, audio, video, and/or a combination of such, where the interview data may be provided by the interviewee in any language. For example, the interview video data may include only text (e.g., non-video data). The interviewee may record responses to each of the interview questions using the interviewee device. Additionally, or alternatively, the interviewee may retrieve stored responses from a memory (e.g., memory 105C) of the interviewee device. For example, the mock interview system may communicate with the interviewee device to display an interview question using text. The interviewee may see the displayed interview question and provide a live response to the interview question using a camera and a microphone of the interviewee device. Additionally, or alternatively, the interviewee may see the displayed interview question and select a pre-recorded response to the interview question from the memory of the interviewee device. Additionally, or alternatively, the interviewee may see the displayed interview question and input a text response to the interview question via the interviewee device.

The method may further include processing, by the one or more processors, the interview video data to determine interview feedback data and future interview recommendation data, wherein the future interview recommendation data includes at least one recommendation for improving the interview feedback data, and wherein the interview feedback data is based on content, clarity, structure, relevance, and depth of the interview video data (Step 312). The interview feedback data may include an analysis of the interviewee's responses to the interview questions. The interview feedback data may be specific for each of the interviewee's responses and/or the interview feedback data may be general and directed to all of the interviewee's responses. For example, processing the interview feedback data may be based on the content, clarity, structure, relevance, and depth of the interview video data. Processing the interview feedback data based on content may include analyzing the words and grammar of the interviewee's responses (e.g., the grammar of text input by the interviewee). Additionally, processing the interview feedback data based on content may further include analyzing the interviewee's body language and/or the interviewee's tone. Processing the interview feedback data based on clarity may include analyzing the word usage of the interviewee's responses (e.g., verbal word usage and/or input text usage). Processing the interview feedback data based on clarity may further include analyzing the interviewee's voice, word enunciation, and speed of the interviewee's responses. Processing the interview feedback data based on structure may include analyzing how the interviewee structured the responses (e.g., verbal structure of the responses and/or input text structure of the responses). Processing the interview feedback data based on relevance may include analyzing the interview video data to determine whether the interviewee's response was relevant to the interview question. Processing the interview feedback data based on depth may include analyzing the interview video data to determine if the interviewee's response provided a sufficient amount of detail.

As previously discussed, in scenarios where the interviewee selected the beginner level, the interview feedback data may be provided to the interviewee after the interviewee answered each question. However, if the interviewee selected the advanced level, the interview feedback data may be provided to the interviewee after the interviewee answered all of the mock interview questions.

The future interview recommendation data may correspond to data that indicates how the interviewee may modify future interview responses to improve the interview feedback data. For example, the future interview recommendation data may indicate that the interviewee should speak more clearly, use different words, speak more slowly, use less hand gestures, and the like. The interviewee may adjust future responses based on the future interview recommendation data, in order to improve the future outcome of an interview.

As shown in FIG. 3B, processing the interview video data may include receiving, by a machine-learning model, input data including the interview video data and the corresponding one or more interview questions, the plurality of competencies, the plurality of employer specified requirements, and the job post data (Step 318). The machine-learning model may receive the interview video data and the input data in real-time. Additionally, or alternatively, the machine-learning model may receive the interview video data and/or the input data from one or more data stores (e.g., database 115A).

Additionally, as shown in FIG. 3B, processing the interview video data may further include determining, by the machine-learning model, the interview feedback data and the future interview recommendation data based on the input data, wherein the interview feedback data includes a plurality of individual scores for the interview video data for each of the one or more interview questions and an overall score for all of the interview video data (Step 320). The machine-learning model may receive the interview video data and the input data (e.g., from the interviewee device 105), and then determine the interview feedback data and/or the future interview recommendation data. The interview feedback data may include individual scores for the interview data. For example, each interview question may have a corresponding score. The interview feedback data may also include an overall score that reflects the interviewee's overall performance in the interview video data. In some embodiments, the individual scores and/or the overall score may be based on the content, clarity, structure, relevance, and depth of the interview video data. The individual scores and/or the overall score may be expressed as a number (e.g., on a scale of 1 to 5). In some embodiments, the machine-learning model may have been previously trained to analyze the interview video data and the input data based on the content, clarity, structure, relevance, and depth of the interview video data to determine the interview feedback data and the future recommendation data.

The method may further include displaying, by the one or more processors, the interview feedback data and the future interview recommendation data on the user interface of the interviewee device (Step 314). For example, the mock interview system (e.g., mock interview system 115) may display some or all of the interview feedback data and/or the future interview recommendation data on a user interface (e.g., display 105A) of the interviewee device (e.g., interviewee device 105). In some embodiments, the interview feedback data and/or the future recommendation data may be in the following form: text, still images, audio, video, and/or a combination of such.

In some embodiments, the interviewee may interact with the interview feedback data. For example, the interviewee may ask the mock interview system questions that are responsive to the interview feedback data. The interviewee may ask the mock interview system questions via inputting text, audio, and/or video. The mock interview system may receive the questions, analyze the questions, and provide responses to such questions. In some embodiments, the mock interview system may use a machine-learning model to analyze the questions and generate responses to such questions.

In some embodiments, the method may further include storing, by the one or more processors, the interview video data and each of the one or more interview questions in at least one database. For example, the mock interview system (e.g., mock interview system 115) may store the interview feedback data and/or the future interview recommendation data in a data store (e.g., database 115A). For example, the interviewee device may send one or more requests to the mock interview system for accessing previous interview questions and responses. Upon receiving the one or more requests, the mock interview system may access the database to retrieve the interview questions and responses. The mock interview system may then send the interview questions and responses to the interviewee device. The interviewee device may display the interview questions and responses via the display and/or store the interview questions and responses in a database (e.g., database 115A). The interviewee may then review the interview questions and responses to determine how to modify future responses to future interview questions.

In some embodiments, the method may include receiving, by the one or more processors, external feedback from an employer corresponding to the plurality of individual scores, wherein the external feedback indicates an accuracy for at least one of the plurality of individual scores. The employer (e.g., employer system 110) may access and analyze the individual scores and the interview video data and the corresponding interview questions. Based on the analyzing, the employer may provide external feedback for one or more of the individual scores to the mock interview system. Additionally, or alternatively, the external feedback from the employer may correspond to the overall score for the interview video data. For example, the employer may provide external feedback for the overall score to the mock interview system. The external feedback may indicate an inaccuracy regarding one or more of the scores. For example, the employer may determine that a score for an interview response was too low, and that the interviewee should have received a higher score. The employer may indicate that such score was too low via the external feedback, where the external feedback may include a new score and/or comments. The comments in the external feedback may include the employer's reasoning regarding the accuracy. For example, the reasoning may state that "the interview response was very clear."

In some embodiments, the mock interview system may allow the employer to provide external feedback after the job post has achieved a specific status. Example job post statuses may include an open status, a closed status, a pending status, and the like. The open status may correspond to a job post for a position that is accepting applicants. The closed status may correspond to a job post for a position that has been filled. The pending status may correspond to a job post for a position that the employer has offered to a candidate, but the candidate has not yet accepted the position. The mock interview system may allow the employer to access interview questions and responses for a job post once the job post has a specific status. For example, the mock interview system may allow the employer to access the interview questions and responses once the job post is closed. If the job post does not have the specific status, the employer may not be able to access any of the interview questions, responses, or any other data associated with the interviewee. Additionally, or alternatively, the employer feedback may be directed towards the interviewee's responses to the interview questions (e.g., not directed towards the interviewee's qualifications). For example, an interviewee's name, address, or other information may be filtered from being available to the employer.

The method may further include retraining, by the one or more processors, the machine-learning model based on the external feedback. The trained machine-learning model may receive the external feedback as training data, where the trained machine-learning model may be continuously tuned by using the external feedback.

Although FIG. 3A shows example blocks of exemplary method 300, in some implementations, the exemplary method 300 may include additional blocks, fewer blocks, different blocks, or differently arranged blocks than those depicted in FIG. 3A. Additionally, or alternatively, two or more of the blocks of the exemplary method 300 may be performed in parallel.

Although FIG. 3B shows example blocks of exemplary method 316, in some implementations, the exemplary method 316 may include additional blocks, fewer blocks, different blocks, or differently arranged blocks than those depicted in FIG. 3B. Additionally, or alternatively, two or more of the blocks of the exemplary method 316 may be performed in parallel.

An exemplary method for automatically analyzing video data (e.g., interview video data) and providing feedback may be described as follows. The exemplary method may include receiving, by one or more processors, post data (e.g., job post data 120G) corresponding to a posting (e.g., a job post) of a web platform (e.g., a job post website), the post data including a plurality of thresholds (e.g., competencies 110B) and a plurality of requirements (e.g., employer specified requirements 110C). The exemplary method may include receiving, by the one or more processors, user profile data from a database (e.g., database 120A), wherein the user profile data includes user data, user credential data, and user accessibility data, and wherein the user accessibility data indicates an accessibility requirement that includes at least one of: a visibility requirement, a language requirement, or an audio requirement.

The exemplary method may include determining, by the one or more processors, one or more queries (e.g., interview questions) corresponding to the plurality of thresholds (e.g., competencies 110B) and the plurality of requirements (e.g., employer specified requirements 110C), the one or more queries including one or more threshold queries (e.g., interview questions based on the competencies) and one or more requirement queries (e.g., interview questions based on the employer specified requirements 110C). At least one database may include the one or more threshold queries corresponding to each of the plurality of thresholds. Additionally, or alternatively, the at least one database may include the one or more requirement queries corresponding to each of the plurality of requirements. In some embodiments, determining the one or more queries may include querying, by the one or more processors, the at least one database for the one or more threshold queries based on the plurality of thresholds. Additionally, determining the one or more queries may further include, in response to the querying, receiving, by the one or more processors, the one or more threshold queries from the at least one database. In some embodiments, determining the one or more queries may include querying, by the one or more processors, the at least one database for the one or more requirement queries based on the plurality of requirements. Additionally, determining the one or more queries may further include, in response to the querying, receiving, by the one or more processors, the one or more requirement queries from the at least one database.

In some embodiments, the exemplary method may include analyzing, by the one or more processors, via the machine-learning model, the posting and the plurality of thresholds (e.g., competencies 110B), and based on the plurality of thresholds, determining, by the one or more processors, via the machine-learning model, at least one additional threshold (e.g., competencies 110B).

In some embodiments, the exemplary method may include analyzing, by the one or more processors, via the machine-learning model, the user credential data (e.g., user resume data), and generating, by the one or more processors, via the machine-learning model, one or more credential queries (e.g., resume interview questions) based on the user credential data, wherein the one or more queries (e.g., interview questions) include the one or more credential queries.

In some embodiments, the exemplary method may include displaying, by the one or more processors, one or more difficulty levels (e.g., a beginner difficulty level or an advanced difficulty level) on the user interface. The exemplary method may further include, in response to the displaying, receiving, by the one or more processors, a user selection of one of the one or more difficulty levels. The exemplary method may further include updating, by the one or more processors, the one or more queries (e.g., interview questions) to include the one or more queries that correspond to the user selection.

The exemplary method may include displaying, by the one or more processors, the one or more queries (e.g., interview questions) in accordance with the user accessibility data on a user interface of a user device. The exemplary method may include receiving, by the one or more processors, via the user interface, user response data (e.g., interview video data) for each of the one or more queries (e.g., interview questions), wherein the user response data (e.g., interview video data) includes visual data and audio data. The exemplary method may include processing, by the one or more processors, via a machine-learning model, the user response data (e.g., interview video data) to determine feedback data and recommendation data. Processing the user response data may include receiving, by the machine-learning model, input data including the user response data (e.g., interview video data) and the corresponding one or more queries (e.g., interview questions), the plurality of thresholds (e.g., competencies 110B), the plurality of requirements (e.g., employer specified requirements 110C), and the post data (e.g., job post data 120G). Processing the user response data may further include determining, by the machine-learning model, the feedback data and the recommendation data corresponding to the input data, wherein the feedback data includes a plurality of individual scores for the user response data (e.g., interview video data) for each of the one or more queries (e.g., interview questions) and an overall score for all of the user response data (e.g., interview video data), and wherein the recommendation data includes at least one recommendation for improving the feedback data. The exemplary method may include displaying, by the one or more processors, the feedback data and the recommendation data on the user interface. In some embodiments, the exemplary method may further include storing, by the one or more processors, the user response data (e.g., interview video data) and each of the one or more queries (e.g., interview questions) in at least one database.

In some embodiments, the exemplary method may further include receiving, by the one or more processors, external feedback corresponding to the plurality of individual scores, wherein the external feedback indicates an accuracy for at least one of the plurality of individual scores. The exemplary method may further include retraining, by the one or more processors, the machine-learning model based on the external feedback.

Exemplary Method for Training a Machine-Learning Model to Provide Feedback

Figure 4:
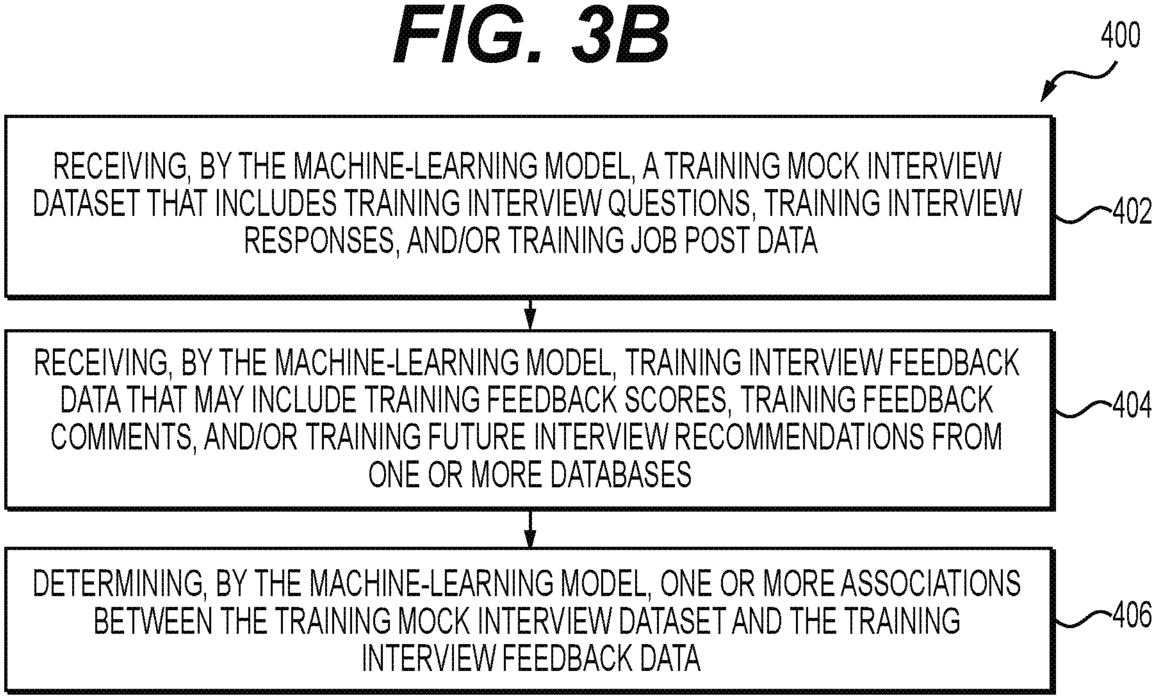
FIG. 4 depicts a flowchart of an exemplary method for training the machine-learning model to determine interview feedback and/or future interview recommendations, according to one or more embodiments

FIG. 4 depicts a flowchart of an exemplary method 400 for training the machine-learning model to determine interview feedback and/or future interview recommendations, according to one or more embodiments. Method 400 may be performed by one or more processors (e.g., processor 115D) of a server (e.g., server 115B) that is in communication with one or more user devices (e.g., interviewee device 105) and other external system(s) (e.g., employer system 110, mock interview system 115, job post system 120) via a network (e.g., network 101). However, it should be noted that method 400 may be performed by any one or more of the interviewee device 105, employer system 110, mock interview system 115, or the job post system 120.

Training the machine-learning model may include receiving, by the machine-learning model, a training mock interview dataset that includes training interview questions, training interview responses, and/or training job post data (Step 402). The machine-learning model may include a large language model (LLM). The training interview questions may include a set of interview questions. The training interview responses may include interview responses to each of the interview questions. The training job post data may include data that corresponds to one or more job posts, such as a job position title, a job position description, an employer, a salary amount, a start date, competencies, and/or employer specified requirements. In some embodiments, the databases that store the training mock interview dataset may be a part of the mock interview system (e.g., mock interview system 115). Alternatively, in other embodiments, the databases that store the training mock interview dataset may be external to the mock interview system.

Training the machine-learning model may further include receiving, by the machine-learning model, training interview feedback data that may include training feedback scores, training feedback comments, and/or training future interview recommendations from one or more databases (e.g., database 115A, database 110A) (Step 404). Additionally, or alternatively, the training interview feedback data may also include the external feedback received from the employer, as discussed above. In some embodiments, an employer system (e.g., employer system 110) may have created and/or stored the training interview feedback data in the database (e.g., database 115A). For example, an employer may associate a training feedback score of "5," training comments of "response lacks clarity," and a future interview recommendation of "speak more slowly" to a particular response. The training feedback score may correspond to a score for each training interview response and/or an overall feedback score for all of the responses to the interview questions. The training feedback comments may include text, still images, audio, or video that include an analysis of the interviewee's responses. The training future interview recommendations may include data that indicates how the interviewee may modify future interview responses to improve the interview feedback data.

Training the machine-learning model may further include determining, by the machine-learning model, one or more associations between the training mock interview dataset and the training interview feedback data (Step 406). The associations may include one or more relationships between the training mock interview dataset and the training interview feedback data. The relationships may indicate different feedback scores for different responses to the interview questions, where the machine-learning model may also learn why a particular response received a particular score.

Although FIG. 4 shows example blocks of exemplary method 400, in some implementations, the exemplary method 400 may include additional blocks, fewer blocks, different blocks, or differently arranged blocks than those depicted in FIG. 4. Additionally, or alternatively, two or more of the blocks of the exemplary method 400 may be performed in parallel.

Exemplary Device

Figure 5:
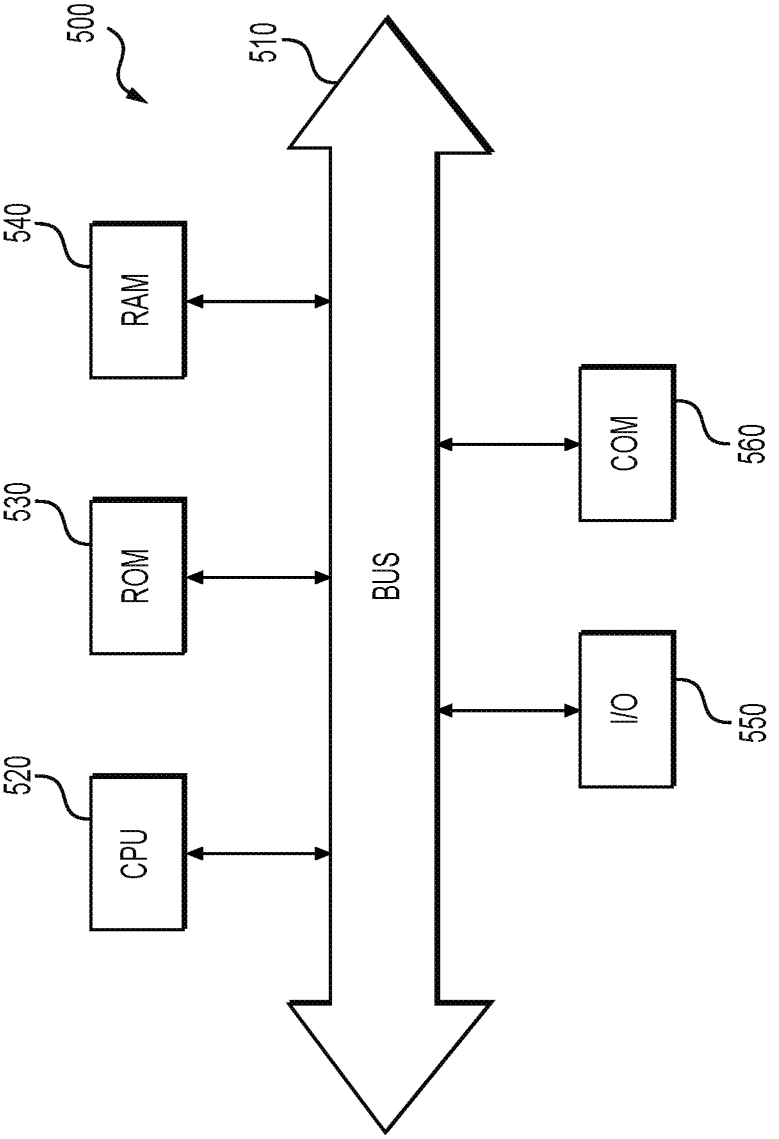
FIG. 5 depicts an example of a computing device that may execute the techniques described herein, according to one or more embodiments.

FIG. 5 is a simplified functional block diagram of a computer 500 that may be configured as a device for executing the methods of FIGS. 2, 3A, 3B, and 4, according to exemplary embodiments of the present disclosure. For example, device 500 may include a central processing unit (CPU) 520. CPU 520 may be any type of processor device including, for example, any type of special purpose or a general-purpose microprocessor device. As will be appreciated by persons skilled in the relevant art, CPU 520 also may be a single processor in a multi-core/multiprocessor system, such system operating alone, or in a cluster of computing devices operating in a cluster or server farm. CPU 520 may be connected to a data communication infrastructure 510, for example, a bus, message queue, network, or multi-core message-passing scheme.

Device 500 also may include a main memory 540, for example, random access memory (RAM), and also may include a secondary memory 530. Secondary memory 530, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 530 may include other similar means for allowing computer programs or other instructions to be loaded into device 500. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 500.

Device 500 also may include a communications interface ("COM") 560. Communications interface 560 allows software and data to be transferred between device 500 and external devices. Communications interface 560 may include a modem, a network interface (such as an Ethernet card), a communications port, a PCMCIA slot and card, or the like. Software and data transferred via communications interface 560 may be in the form of signals, which may be electronic, electromagnetic, optical, or other signals capable of being received by communications interface 560. These signals may be provided to communications interface 560 via a communications path of device 500, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 500 also may include input and output ports 550 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as those used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used herein may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In the detailed description herein, references to "embodiment," "an embodiment," "one non-limiting embodiment," "in various embodiments," etc., indicate that the embodiment(s) described can include a particular feature, structure, or characteristic, but every embodiment might not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In general, terminology can be understood at least in part from usage in context. For example, terms, such as "and", "or", or "and/or," as used herein can include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, can be used to describe any feature, structure, or characteristic in a singular sense or can be used to describe combinations of features, structures or characteristics in a plural sense. Similarly, terms, such as "a," "an," or "the," again, can be understood to convey a singular usage or to convey a plural usage, depending at least in part upon context. In addition, the term "based on" can be understood as not necessarily intended to convey an exclusive set of factors and can, instead, allow for existence of additional factors not necessarily expressly described, again, depending at least in part on context.

As used herein, the terms "comprises," "comprising," or any other variation thereof are intended to cover a non-exclusive inclusion, such that a process, method, composition, article, or apparatus that comprises a list of elements does not include only those elements, but may include other elements not expressly listed or inherent to such process, method, composition, article, or apparatus. The term "exemplary" is used in the sense of "example" rather than "ideal." As used herein, the singular forms "a," "an," and "the" include plural reference unless the context dictates otherwise. Relative terms such as "about," "substantially," and "approximately" refer to being nearly the same as a referenced number or value, and should be understood to encompass a variation of ±5% of a specified amount or value.

As used herein, a "model" or "machine-learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine-learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine-learning model may operate on an input linearly, in parallel, via a network (e.g., a neural network), or via any suitable configuration.

The execution of the machine-learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. Any suitable type of training may be used, e.g., stochastic, gradient boosted, random seeded, recursive, epoch or batch-based, etc.

Certain non-limiting embodiments are described herein with reference to block diagrams and operational illustrations of methods, processes, devices, and apparatus. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the description and the appended drawings, wherein like elements are referred to with the same reference numerals.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for analyzing mock interview video data and providing interview feedback to an interviewee, the computer-implemented method comprising:

receiving, by one or more processors:

a user selection of a job post displayed on a job website, and user resume data corresponding to the job post;

launching, by the one or more processors and in response to the user selection, a mock interview application directly from the selected job post;

analyzing, by the one or more processors, job post data corresponding to the job post, the job post data including a plurality of competencies and a plurality of employer specified requirements;

determining, by the one or more processors, one or more interview questions corresponding to the plurality of competencies and the plurality of employer specified requirements;

applying, by the one or more processors, a machine-learning model to the user resume data to infer user accessibility data corresponding to the user resume data, wherein the user accessibility data includes an accessibility requirement that includes at least one of:

a visibility requirement corresponding to a display format of the one or more interview questions to the interviewee, or an audio requirement corresponding to an audio output format of the one or more interview questions to the interviewee;

based at least in part on the user accessibility data, outputting, by the one or more processors, the one or more interview questions via a user interface or an audio device of an interviewee device;

receiving, by the one or more processors, via the user interface, interview video data for each of the one or more interview questions from the interviewee, wherein the interview video data includes visual data and audio data;

processing, by the one or more processors, the interview video data to determine interview feedback data and future interview recommendation data, wherein the future interview recommendation data includes at least one recommendation for improving the interview feedback data, and wherein the interview feedback data is based on content, clarity, structure, relevance, and depth of the interview video data;

based at least in part on the user accessibility data, outputting, by the one or more processors, the interview feedback data and the future interview recommendation data via the user interface or the audio device of the interviewee device;

receiving, by the one or more processors, feedback from an employer corresponding to a plurality of individual scores output from the machine-learning model applied to the interview video data, wherein the feedback indicates an accuracy for at least one of the plurality of individual scores; and retraining, by the one or more processors, the machine-learning model based on the feedback.

2. The computer-implemented method of claim 1, wherein the accessibility requirement includes a language requirement corresponding to a language for presenting the one or more interview questions to the interviewee.

3. The computer-implemented method of claim 2, wherein the displaying the one or more interview questions is in accordance with the user accessibility data on the user interface of the interviewee device.

4. The computer-implemented method of claim 2, wherein processing the interview video data to determine the interview feedback data and the future interview recommendation data includes:

receiving, by the machine-learning model, input data including the interview video data and the corresponding one or more interview questions, the plurality of competencies, the plurality of employer specified requirements, and the job post data; and determining, by the machine-learning model, the interview feedback data and the future interview recommendation data corresponding to the input data, wherein the interview feedback data includes the plurality of individual scores for the interview video data for each of the one or more interview questions and an overall score for all of the interview video data.

5. The computer-implemented method of claim 4, the computer-implemented method further comprising:

displaying, by the one or more processors, one or more interview question difficulty levels on the user interface;

in response to the displaying, receiving, by the one or more processors, a user selection of one of the one or more interview question difficulty levels; and updating, by the one or more processors, the one or more interview questions to correspond to the selected one or more interview question difficulty levels.

6. The computer-implemented method of claim 4, the computer-implemented method further comprising:

analyzing, by the one or more processors, via the machine-learning model, the job post data and the plurality of competencies; and based on the plurality of competencies, determining, by the one or more processors, via the machine-learning model, at least one additional competency.

7. The computer-implemented method of claim 4, the computer-implemented method further comprising:

analyzing, by the one or more processors, via the machine-learning model, the user resume data; and generating, by the one or more processors, via the machine-learning model, one or more resume interview questions based on the user resume data, wherein the one or more interview questions include the one or more resume interview questions.

8. The computer-implemented method of claim 1, wherein the interview video data is provided in any language.

9. The computer-implemented method of claim 1, wherein at least one database stores the one or more interview questions.

10. The computer-implemented method of claim 9, wherein determining the one or more interview questions corresponding to the plurality of competencies and the plurality of employer specified requirements further comprises:

querying, by the one or more processors, the at least one database for the one or more interview questions based on the plurality of competencies; and in response to the querying, receiving, by the one or more processors, the one or more interview questions from the at least one database.

11. The computer-implemented method of claim 9, wherein determining the one or more interview questions corresponding to the plurality of competencies and the plurality of employer specified requirements further comprises:

querying, by the one or more processors, the at least one database for the one or more interview questions based on the plurality of employer specified requirements; and in response to the querying, receiving, by the one or more processors, the one or more interview questions from the at least one database.

12. The computer-implemented method of claim 1, wherein the computer-implemented method further comprises:

storing, by the one or more processors, the interview video data and each of the one or more interview questions in at least one database.

13. A computer system for analyzing mock interview video data and providing interview feedback to an interviewee, the computer system comprising:

a memory having processor-readable instructions stored therein; and one or more processors configured to access the memory and execute the processor-readable instructions, which when executed by the one or more processors configures the one or more processors to perform a plurality of functions, including functions for:

receiving a user selection of a job post displayed on a job website and user resume data corresponding to the job post;

launching a mock interview application from the job post on the job website;

analyzing job post data corresponding to the job post, the job post data including a plurality of competencies and a plurality of employer specified requirements;

determining one or more interview questions corresponding to the plurality of competencies and the plurality of employer specified requirements;

applying a machine-learning model to the user resume data to infer user accessibility data corresponding to the user resume data, wherein the user accessibility data includes an accessibility requirement that includes at least one of:

a visibility requirement corresponding to a display format of the one or more interview questions to the interviewee, or an audio requirement corresponding to an audio output format of the one or more interview questions to the interviewee;

based at least in part on the user accessibility data, outputting the one or more interview questions via a user interface or an audio device of an interviewee device;

receiving, via the user interface, interview video data for each of the one or more interview questions from an interviewee, wherein the interview video data includes visual data and audio data;

processing the interview video data to determine interview feedback data and future interview recommendation data, wherein the future interview recommendation data includes at least one recommendation for improving the interview feedback data;

storing the interview video data and each of the one or more interview questions in at least one database;

based at least in part on the user accessibility data, outputting the interview feedback data and the future interview recommendation data via the user interface or the audio device of the interviewee device;

receiving, by the one or more processors, feedback from an employer corresponding to a plurality of individual scores output from a machine-learning model applied to the interview video data, wherein the feedback indicates an accuracy for at least one of the plurality of individual scores; and retraining, by the one or more processors, the machine-learning model based on the feedback.

14. The computer system of claim 13, wherein the accessibility requirement includes a language requirement corresponding to a language for presenting the one or more interview questions to the interviewee.

15. The computer system of claim 14, wherein the displaying the one or more interview questions is in accordance with the user accessibility data on the user interface of the interviewee device.

16. The computer system of claim 14, wherein processing the interview video data to determine the interview feedback data and the future interview recommendation data includes:

receiving, by the machine-learning model, input data including the interview video data and the corresponding one or more interview questions, the plurality of competencies, the plurality of employer specified requirements, and the job post data; and determining, by the machine-learning model, the interview feedback data and the future interview recommendation data corresponding to the input data, wherein the interview feedback data includes the plurality of individual scores for the interview video data for each of the one or more interview questions and an overall score for all of the interview video data.

17. The computer system of claim 13, wherein the interview video data is provided in any language.

18. A non-transitory computer-readable medium containing instructions for analyzing video data and providing interview feedback to an interviewee, the instructions comprising:

receiving, by one or more processors, a user selection of a job post displayed on a job website and user resume data corresponding to the job post;

launching, by the one or more processors, a mock interview application from the job post on the job website;

analyzing, by the one or more processors, job post data corresponding to the job post, the job post data including a plurality of competencies and a plurality of employer specified requirements;

determining, by the one or more processors, one or more interview questions corresponding to the plurality of competencies and the plurality of employer specified requirements;

applying, by the one or more processors, a machine-learning model to the user resume data to infer user accessibility data corresponding to the user resume data, wherein the user accessibility data includes an accessibility requirement that includes at least one of:

a visibility requirement corresponding to a display format of the one or more interview questions to the interviewee, or an audio requirement corresponding to an audio output format of the one or more interview questions to the interviewee;

based at least in part on the user accessibility data, outputting, by the one or more processors, the one or more interview questions via a user interface or an audio device of an interviewee device;

receiving, by the one or more processors, via the user interface, interview video data for each of the one or more interview questions from an interviewee, wherein the interview video data includes visual data and audio data;

processing, by the one or more processors, the interview video data to determine interview feedback data and future interview recommendation data, wherein the future interview recommendation data includes at least one recommendation for improving the interview feedback data;

based at least in part on the user accessibility data, outputting, by the one or more processors, the interview feedback data and the future interview recommendation data via the user interface or the audio device of the interviewee device;

receiving, by the one or more processors, feedback from an employer corresponding to a plurality of individual scores output from a machine-learning model applied to the interview video data, wherein the feedback indicates an accuracy for at least one of the plurality of individual scores; and retraining, by the one or more processors, the machine-learning model based on the feedback.

19. The non-transitory computer-readable medium of claim 18, the instructions further comprising:

displaying, by the one or more processors, one or more interview question difficulty levels on the user interface;

in response to the displaying, receiving, by the one or more processors, a user selection of one of the one or more interview question difficulty levels; and updating, by the one or more processors, the one or more interview questions to correspond to the selected one or more interview question difficulty levels.

20. The non-transitory computer-readable medium of claim 18, wherein the accessibility requirement includes a language requirement corresponding to a language for presenting the one or more interview questions to the interviewee.

* * * * *